United States Patent
Edmondson et al.

(10) Patent No.: US 7,868,901 B1
(45) Date of Patent: Jan. 11, 2011

(54) METHOD AND SYSTEM FOR REDUCING MEMORY BANDWIDTH REQUIREMENTS IN AN ANTI-ALIASING OPERATION

(75) Inventors: John H. Edmondson, Arlington, MA (US); Steven E. Molnar, Chapel Hill, NC (US); Bengt-Olaf Schneider, Yorktown Heights, NY (US); Gary C. King, San Jose, CA (US); Michael J. M. Toksvig, Palo Alto, CA (US); Peter B. Holmqvist, Cary, NC (US); James M. O'Connor, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 21 days.

(21) Appl. No.: 11/557,085

(22) Filed: Nov. 6, 2006

Related U.S. Application Data

(63) Continuation-in-part of application No. 10/980,078, filed on Nov. 2, 2004, now Pat. No. 7,333,119.

(51) Int. Cl.
*G09G 5/00* (2006.01)
(52) U.S. Cl. .......... 345/611; 345/422; 345/605; 345/613; 345/614; 345/639; 382/166; 382/268; 382/269; 382/275
(58) Field of Classification Search .......... 345/614, 345/639
See application file for complete search history.

(56) References Cited

U.S. PATENT DOCUMENTS

| | | | |
|---|---|---|---|
| 5,818,456 A * | 10/1998 | Cosman et al. .......... 345/614 |
| 6,072,500 A * | 6/2000 | Foran et al. .......... 345/611 |
| 6,366,289 B1 | 4/2002 | Johns |
| 6,452,595 B1 | 9/2002 | Montrym |
| 6,469,707 B1 | 10/2002 | Voorhies |
| 6,614,449 B1 * | 9/2003 | Morein .......... 345/611 |
| 6,720,975 B1 | 4/2004 | Dietrich |
| 6,768,491 B2 | 7/2004 | Lefebvre et al. |
| 6,825,847 B1 | 11/2004 | Molnar et al. |
| 6,989,835 B2 | 1/2006 | Deering et al. |
| 6,999,100 B1 | 2/2006 | Leather et al. |
| 7,123,277 B2 | 10/2006 | Brown et al. |
| 2004/0161146 A1 | 8/2004 | Van Hook et al. |
| 2004/0196297 A1 | 10/2004 | Elliott et al. |
| 2005/0265614 A1 | 12/2005 | Seong et al. |
| 2005/0270305 A1 | 12/2005 | Rasmussen et al. |

OTHER PUBLICATIONS

Office Action, U.S. Appl. No. 11/557, filed Oct. 2, 2009.
Notice of Allowance. U.S. Appl. No. 11/557,076, filed Nov. 18, 2009.
Office Action, U.S. Appl. No. 11/557,068, filed Mar. 26, 2010.

* cited by examiner

*Primary Examiner*—Antonio A Caschera
(74) *Attorney, Agent, or Firm*—Patterson & Sheridan, LLP

(57) ABSTRACT

Embodiments of the present invention sets forth a method and system for reducing memory bandwidth requirements for an anti-aliasing operation. The first virtual coverage information for a pixel involved in an anti-aliasing operation is maintained in memory. If a certain operating condition of the anti-aliasing operation deterministically implies the second virtual coverage information for this pixel, the second virtual coverage information, as opposed to the first virtual coverage information, is used in the anti-aliasing operation. In such situations, since the virtual coverage information is implied, it does not have to be accessed from memory, thereby improving overall system performance.

20 Claims, 7 Drawing Sheets

Memory Map
400

| Z-data$_{pixel\ 300}$ | VC$_{pixel\ 300}$ | Z-data$_{pixel\ 402}$ | VC$_{pixel\ 402}$ | ••• |
| Z-data$_{pixel\ 404}$ | VC$_{pixel\ 404}$ | Z-data$_{pixel\ 406}$ | VC$_{pixel\ 406}$ | ••• |

Memory Map
450

| Z-data$_{pixel\ 300}$ | Z-data$_{pixel\ 402}$ | Z-data$_{pixel\ 404}$ | |
| ⋮ | | | ••• |
| VC$_{pixel\ 300}$ | VC$_{pixel\ 402}$ | VC$_{pixel\ 404}$ | ••• |

METHOD AND SYSTEM FOR REDUCING MEMORY BANDWIDTH REQUIREMENTS IN AN ANTI-ALIASING OPERATION

CROSS REFERENCE TO RELATED APPLICATIONS

The current application is a continuation-in-part of the U.S. patent application titled, "System and Method for Virtual Coverage Anti-Aliasinng," filed on Nov. 2, 2004 and having patent application Ser. No. 10/980,078 now U.S. Pat. No. 7,333,119. This related patent application is incorporated herein by reference in its entirety. The current application also relates to the U.S. patent application titled, "Color Compression Using Automatic Reduction of Multi-Sample Pixels," filed on Nov. 6, 2006 having patent application Ser. No. 11/557,068. This related patent application is also incorporated here by reference in its entirety.

BACKGROUND OF THE INVENTION

1. Field of the Invention

Embodiments of the present invention relate generally to computer graphics applications and more specifically to reducing memory bandwidth requirements in an anti-aliasing operation.

2. Description of the Related Art

Unless otherwise indicated herein, the approaches described in this section are not prior art to the claims in this application and are not admitted to be prior art by inclusion in this section.

Anti-aliasing processing typically occurs during the rendering stage of graphics processing and is generally used to diminish artifacts such as "jaggies," which are stair-like lines that appear at places in an image where there should be smooth, straight lines or curves. To achieve high quality anti-aliasing results without significantly scaling up the memory footprint and bandwidth requirements, one approach is the virtual coverage anti-aliasing ("VCAA") technique, which is discussed and claimed in the U.S. application titled, "System and Method for Virtual Coverage Anti-Aliasing," referenced above. Basically, the VCAA technique extends the concept of multi-sample anti-aliasing by weighing different color contributions of the real samples, also referred to as real subpixels, of each pixel to determine the color of the pixel. To influence the aforementioned color contributions, the VCAA technique creates and utilizes a set of virtual samples for each pixel. Unlike a real sample, which is uniquely associated with at least Z-data and color data, a virtual sample does not have such association. Instead, a virtual sample contains information associating with or pointing to one or more real samples based on geometric primitive coverage. Such information is also referred to as "virtual coverage information" or "virtual sample coverage information." Because the virtual samples mainly provide the affiliation information to the real samples and also the additional coverage information of one or more geometric primitives on the pixel but not the Z-data and color data, they are represented by significantly fewer bits than the real samples.

The virtual samples with the aforementioned affiliation and coverage information generally are stored in the frame buffer. This affiliation and coverage information is needed and potentially updated when performing, for example, Z-testing on the real samples. Thus, to either update or retrieve these virtual samples, the frame buffer needs to be accessed. Such accesses consume frame buffer bandwidth, which is somewhat limited in typical graphics processing unit ("GPU") designs, and also the resources of the requesting component. Repeated accesses of the frame buffer for virtual sample information can thus limit overall system performance.

As the foregoing illustrates, what is needed is a way to efficiently manage the accesses of the virtual samples to further improve the overall performance of anti-aliasing operations performed by a GPU.

SUMMARY OF THE INVENTION

A method and system for reducing memory bandwidth requirements for an anti-aliasing operation are disclosed. In one embodiment, the first virtual coverage information for a pixel involved in an anti-aliasing operation is maintained. If a certain operating condition of the anti-aliasing operation deterministically implies the second virtual coverage information for this pixel, the second virtual coverage information, as opposed to the first virtual coverage information, is used in the anti-aliasing operation.

One advantage of the disclosed method and system is that they provide a way to reduce accesses made to the frame buffer of a graphics system, thereby improving the overall performance of the graphics system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a conceptual diagram of a memory map with interleaved storage of the Z-data and the virtual coverage information in the depth buffer, according to one embodiment of the present invention;

FIG. 4B is a conceptual diagram of another memory map with distinct storage areas for the Z-data and the virtual coverage information in the depth buffer, according to another embodiment of the present invention;

DETAILED DESCRIPTION

A method and system for reducing memory bandwidth requirements in an anti-aliasing operation are described. In the following description, for the purposes of explanation, numerous specific details are set forth in order to provide a thorough understanding of the present invention. It will be apparent, however, to one skilled in the art that the present invention may be practiced without these specific details.

Throughout this disclosure, "geometric primitive" and "primitive" are used interchangeably. To render a computer graphics image, each geometric primitive, such as a triangle, is transformed into a screen-aligned coordinate system, referred to as "screen space." Each geometric primitive can be mapped into a discrete and finite grid of "tiles" in memory, each of which further includes a discrete and finite grid of "frame buffer pixels," which are used interchangeably with "pixels." The depth value and stencil data associated with a pixel are used to determine pixel visibility. The combination of depth value and stencil data is referred to herein as "Z-data." Each pixel can be further divided into a discrete and finite grid of "subpixels," which are used interchangeably with "samples." Each "real sample" is uniquely associated with at least Z-data and color data, but a "virtual sample" does not have such association. Instead, a virtual sample contains information associating with or pointing to one or more real samples based on geometric primitive coverage. Such information is also referred to as "virtual coverage information" or "virtual sample coverage information." If a real sample and a virtual sample are covered by the same geometric primitive, then the virtual sample is associated with the real sample and is assumed to have the same color data as the real sample. Each real sample and virtual sample occupies a unique location within a pixel.

Figure 1:
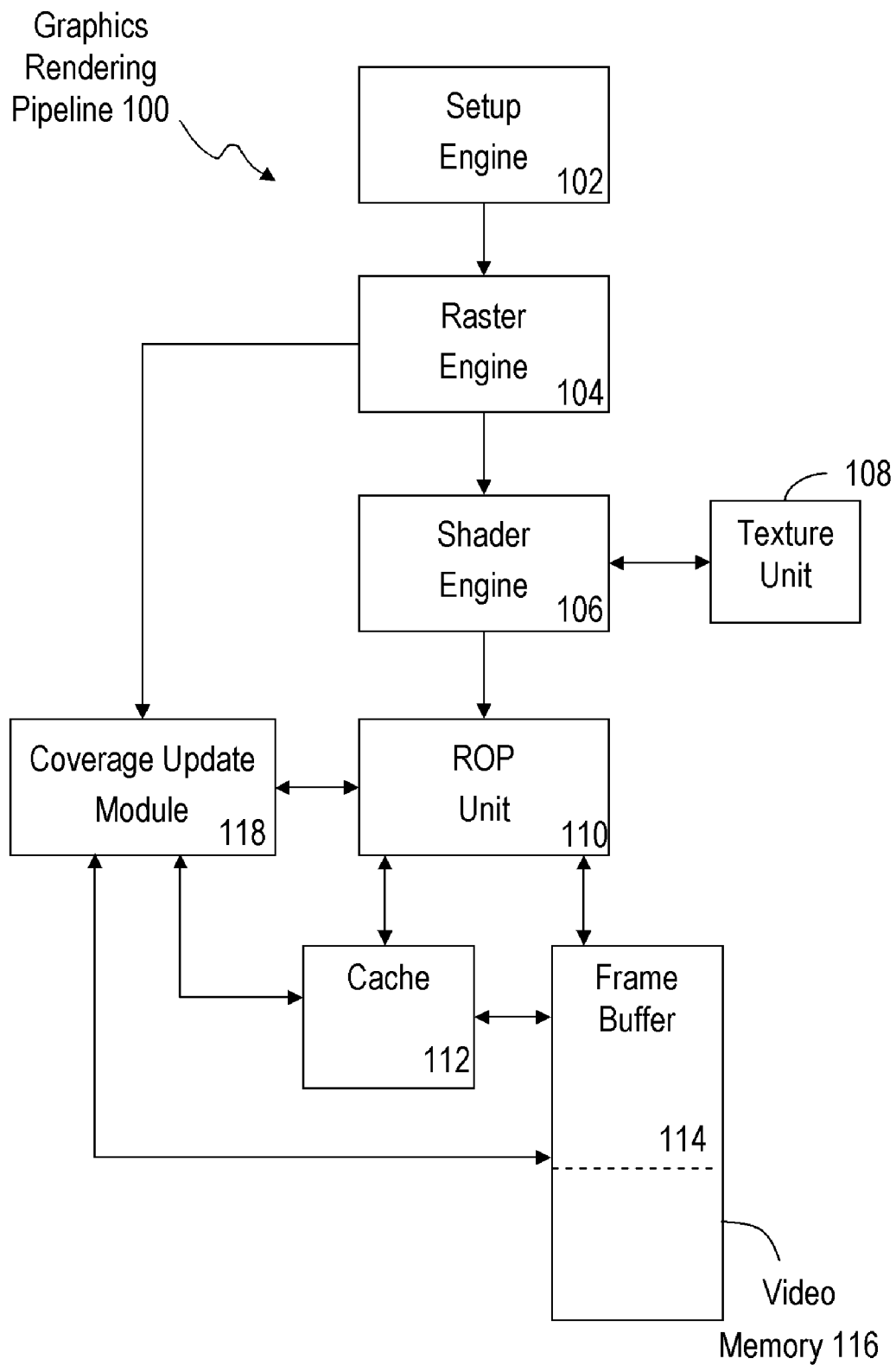
FIG. 1 is a conceptual diagram of data flow through a graphics rendering pipeline, according to one embodiment of the present invention.

FIG. 1 is a conceptual diagram of data flow through graphics rendering pipeline 100, according to one embodiment of the present invention. Specifically, one embodiment of setup engine 102 receives geometric primitives from a graphics driver, which is executed by a processor in a system, such as system 600 shown in FIG. 6, and generates 2D primitives suitable for the operations of raster engine 104. Setup engine 102 also tracks the rendering states in graphics rendering pipeline 100 and coordinates certain changes therein. Some rendering states are established prior to initiating the rendering process on a given primitive, and some rendering states are dynamically updated as the primitive progresses through graphics rendering pipeline 100.

One embodiment of raster engine 104 traverses and decomposes the 2D geometric primitives into fragments, corresponding to screen space pixels that are at least partially covered by the geometric primitives. These fragments correspond to tiles of pixels in frame buffer 114; each of the pixels further contains real samples and virtual samples. In addition, raster engine 104 sets appropriate coverage masks to identify the real samples that are within the coverage area of a primitive and to identify the virtual samples that are covered by the same primitive as the real samples. Subsequent paragraphs will further describe the process of affiliating the virtual samples to the real samples and generating the virtual coverage masks for certain operations that utilize the virtual samples, such as the VCAA operation.

In addition, raster engine 104 establishes different compression status information depending on the coverage of a tile by one or more geometric primitives. For example, one status may indicate that the fragment data, such as the Z-data or the color data, associated to the tile are not eligible for reduction, because the tile is not completely covered by any one geometric primitive. Another status may indicate the fragment data associated to the tile are eligible for reduction, because it is fully covered by a single geometric primitive.

Shader engine 106 may compute, without limitation, color and Z-data for the pixels that are within the tile. Texture unit 108 applies one or more texture values to each of such pixels. For the real samples that raster engine 104 determines to be within the coverage area of a particular geometric primitive, Raster OPeration ("ROP") unit 110 generally reads and writes their Z-data, compares their Z-data to determine occlusion, reads and writes their color data, and performs alpha blending and testing. ROP unit 110 also interacts with cache 112 and frame buffer 114. The Z-data and the color data typically are stored in the depth buffer and the color buffer, respectively, both of which reside in frame buffer 114. For VCAA operations, the virtual coverage information generated by raster engine 104, as mentioned above, is utilized to adjust the weight given to the color components of the real samples when computing the final color value for a pixel. Subsequent paragraphs will further detail the generation of virtual coverage information.

One embodiment of ROP unit 100 utilizes the compression status information from raster engine 104 to access the data in frame buffer 114. In one implementation, each tile has an associated on-chip memory location, such as a location in cache 112, which stores the current format in which the tile should be accessed. If a tile is to be stored in frame buffer 114 and if the compression status information indicates that the data are eligible for reduction, then ROP unit 100 stores the data in a compressed format and sets certain compression state bits in cache 112. On the other hand, if a tile is to be retrieved from frame buffer 114, then ROP unit 100 queries the compression state bits in cache 112 to determine whether the data being accessed are compressed or non-compressed. As an illustration, if the compression state bits of "00" are set, then that indicates no compression is performed on the tile. If the compression state bits of "01" are set, then that indicates the tile is compressed on a single Z plane and is covered by a single geometric primitive.

Moreover, one embodiment of graphics rendering pipeline 100 also includes coverage update module 118, which is mainly responsible for accessing or storing the virtual coverage information for the different virtual samples related to a particular pixel. The virtual coverage information typically is stored in frame buffer 114 and may be stored along with the other types of data, such as the Z-data or the color data for the pixel. When a new primitive is processed in the graphics pipeline, the coverage of a particular tile may change, which may change the association between the real samples and the virtual samples. In one implementation, coverage update module 118 determines whether to update the stored virtual coverage information to reflect these changes. Moreover, in the event the stored virtual coverage information is requested, coverage update module 118 determines whether to access memory to retrieve the requested information. It should be apparent to one with ordinary skill in the art to combine the functionality of coverage update module 118 with other components, such as ROP unit 110, or distribute the functionality to multiple components, such as raster engine 104 and ROP unit 110, without exceeding the scope of the claimed invention. Subsequent paragraphs will further describe the functionality of coverage update module 118.

Figure 2A:
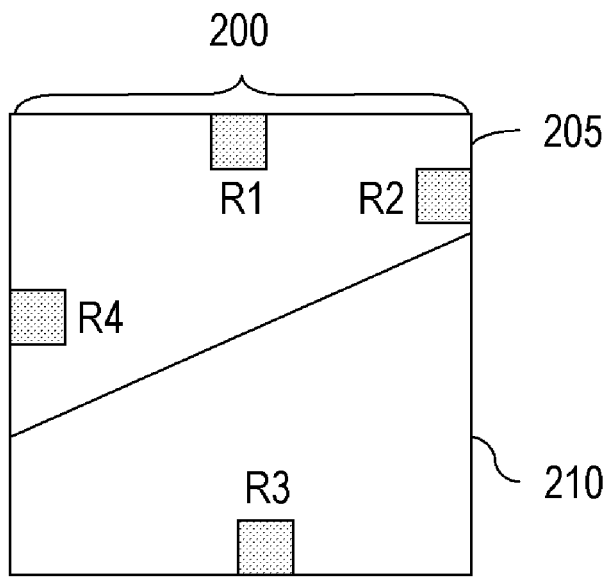
FIG. 2A illustrates a simplified representation of a pixel, which includes four real samples.

FIG. 2A illustrates a simplified representation of pixel 200, which includes four real samples: R1, R2, R3, and R4. Each an upper real sample may include, for example, color component data (i.e., the color of the primitive at the sample location) and/or other data, such as the Z-data (which may, for example, be used to determine whether the visibility of the primitive). In this example, an upper portion of pixel 200 is covered by a first primitive, 205, whereas a lower portion of pixel 200 is covered by a second primitive, 210. First primitive 205 covers three real samples R1, R2, and R4, and second primitive 210 covers real sample R3. In this example, if each real sample is weighed equally in an anti-aliasing operation (e.g., 25% for the color value of each real sample), then real sample R3 would contribute only 25% to the final color value even though second primitive 210 covers more than 25% of the area of pixel 200.

Figure 2B:
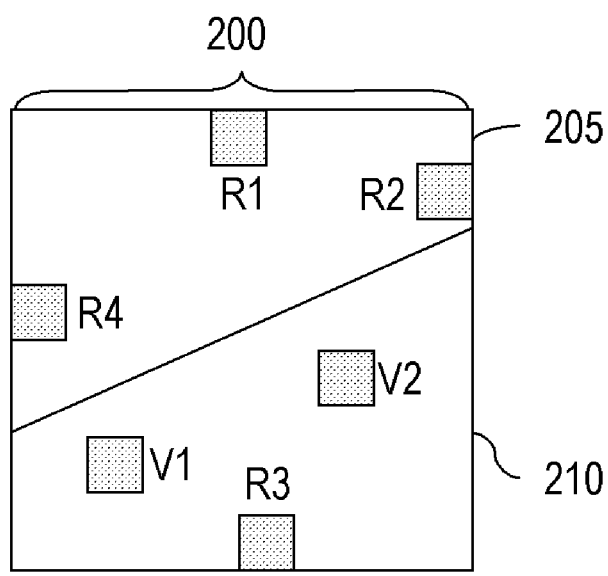
FIG. 2B illustrates a simplified representation of another pixel, which includes four real samples and two virtual samples.

FIG. 2B illustrates the same pixel as in FIG. 2A but with the addition of two virtual samples, V1 and V2. In this example, the virtual samples, V1 and V2, and real sample R3 are covered by second primitive 210. As a result, V1 and V2 are both associated with R3 and therefore are assigned the same color information as R3. Together with the contributions from V1 and V2, the color information of R3 as a result contributes more to the final color value than the 25% mentioned above in an anti-aliasing operation in better proportion to the actual coverage percentage of second primitive 210 within pixel 200.

As mentioned above, unlike a real sample, a virtual sample is not uniquely associated with Z-data and/or color data. Thus, a virtual sample requires only sufficient bits to be associated with or to point to all the real samples in a pixel that are covered by the same primitive also covering the virtual sample. In one implementation, 1 bit is allocated to represent the association to a real sample, and each real sample is assigned a pre-selected bit code. As an illustration, in FIG. 3, suppose a single primitive covers the entire pixel grid of pixel 300, as indicated by the uniform shading of the entire 16×16 grid. Pixel 300 contains 4 real samples, such as 0, 1, 2, and 3, and 12 virtual samples, such as A, B, C, D, E, F, G, H, I, J, K, and L. Suppose further that samples 0, 1, 2, and 3 are uniquely identified by 4-bit bit codes of 0001, 0010, 0100, and 1000, respectively. As discussed above, if a virtual sample and a real sample are covered by the same primitive, then the virtual sample is said to be associated with the real sample. In this case, because all the samples are covered by the same primitive, each of the 12 virtual samples is associated with all of the 4 real samples in pixel 300. In one embodiment, logical OR operations are performed among the real samples to capture the aforementioned association between the two types of samples. In this case, each of the 12 virtual samples in pixel 300 would contain the virtual coverage information of 1111 as shown in the table below by logically ORing 0001, 0010, 0100, and 1000:

| A | 1111 | G | 1111 |
| B | 1111 | H | 1111 |
| C | 1111 | I | 1111 |
| D | 1111 | J | 1111 |
| E | 1111 | K | 1111 |
| F | 1111 | L | 1111 |

Each of the samples shown in pixel 300 has a corresponding memory location in frame buffer 114 of FIG. 1. In one implementation, the virtual samples are stored along with the Z-data of the real samples in the depth buffer, which can also be a part of frame buffer 114. FIG. 4A is a conceptual diagram of a memory map, memory map 400, illustrating the storage of the Z-data and the virtual coverage information of pixels in an interleaved arrangement in the depth buffer. Specifically, the Z-data of the real samples for pixel 300 shown in FIG. 3, Z-data$_{pixel\ 300}$, and the virtual coverage information provided by the virtual samples, VC$_{pixel\ 300}$, are stored in contiguous memory locations. Also, the Z-data and the virtual coverage information pairs of other pixels, such as pixel 402, 404, and 406, are stored together and are in adjacent memory locations.

Alternatively, FIG. 4B is a conceptual diagram of another memory map, memory map 450, also for illustrating the storage of the Z-data and the virtual coverage information of pixels in the depth buffer. Unlike memory map 400, the Z-data and the virtual coverage information of all the pixels in a given tile are stored separately in two distinct sets of contiguous memory locations.

Figure 3:
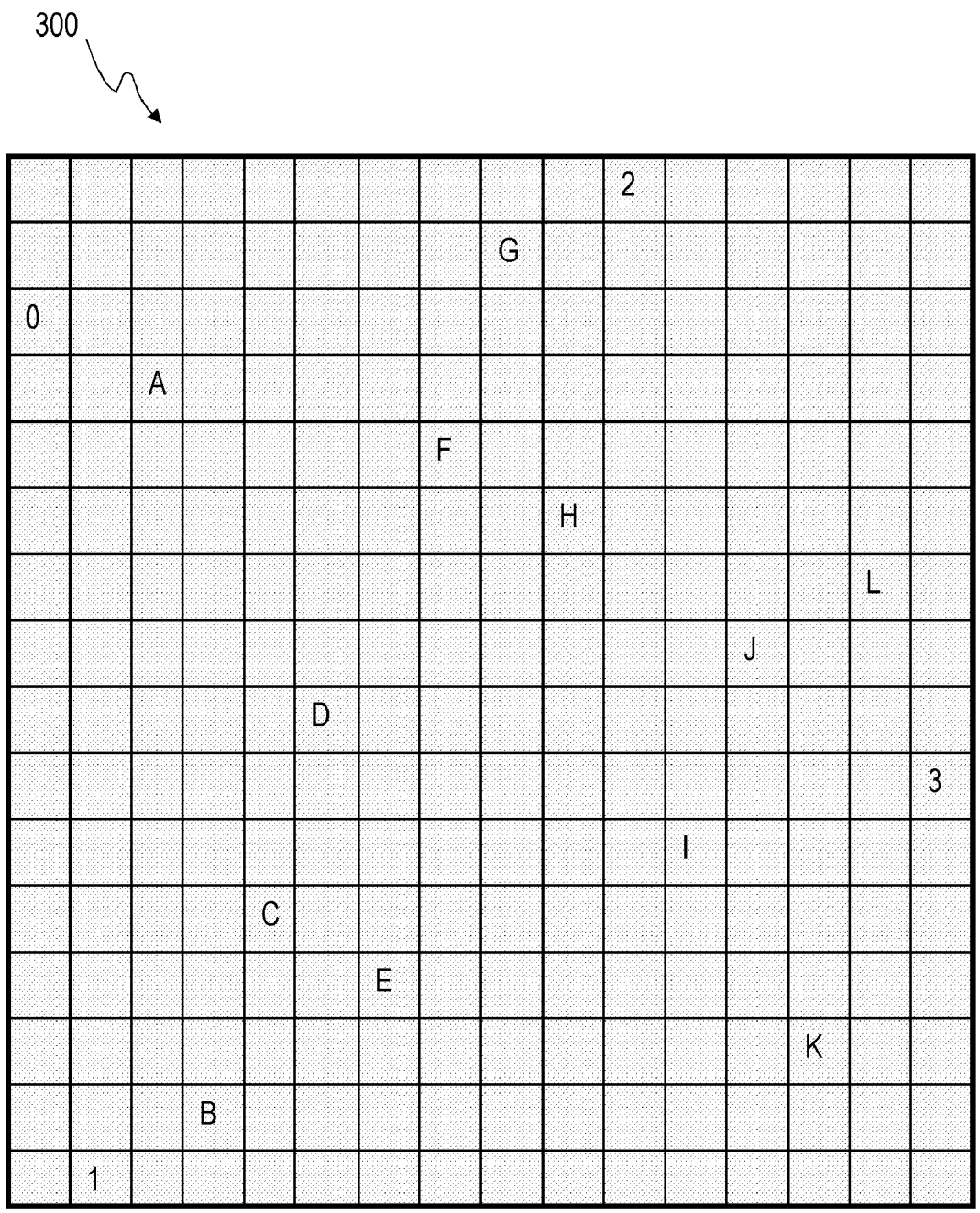
FIG. 3 illustrates a simplified representation of yet another pixel, which is fully covered by a single geometric primitive and includes four real samples and twelve virtual samples, according to one embodiment of the present invention.
Figure 5A:
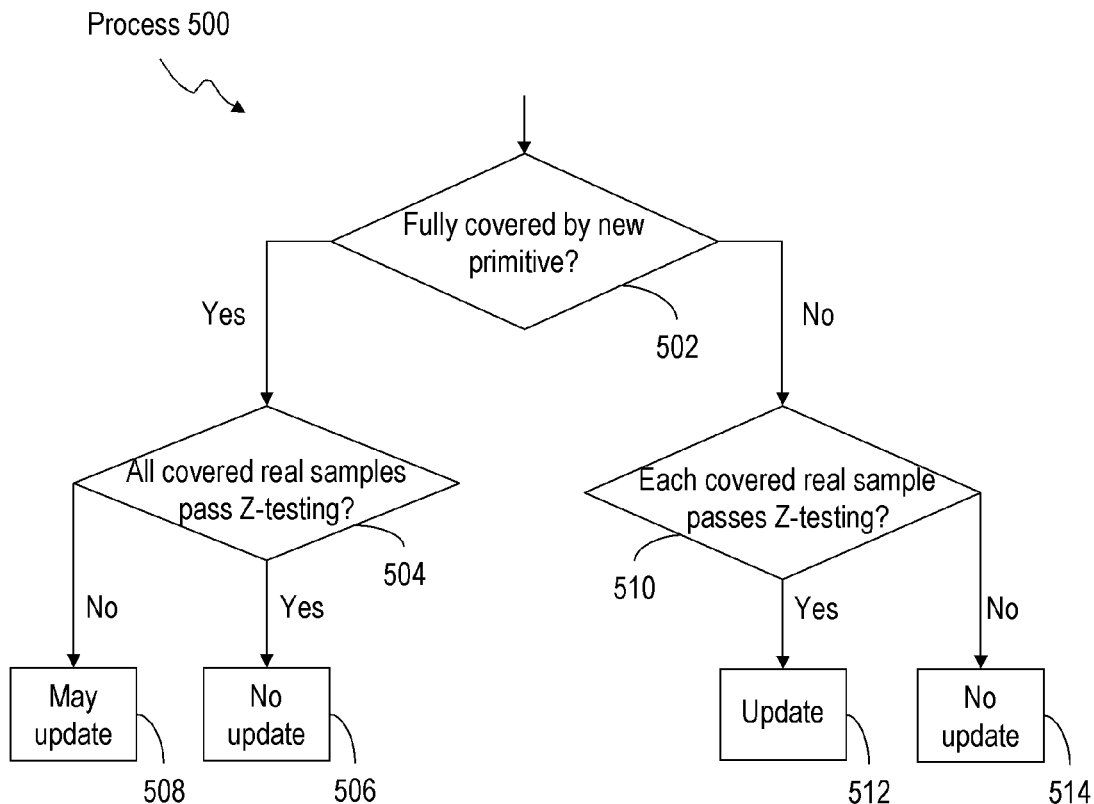
FIG. 5A is a flow diagram of a write process that a coverage update module follows in the event of a new primitive crossing a new real sample, according to one embodiment of the present invention.

FIG. 5A is a flow diagram of a write process, process 500, that coverage update module 118 follows in the event of a new primitive intersects with a tile. For discussion purposes, suppose virtual coverage information is stored along with Z-data in the depth buffer. In step 502, if all the new real and virtual samples in the tile are determined to be covered by the new primitive, then coverage update module 118 checks with ROP unit 110 whether all the new real samples that are covered by the new primitive pass the Z-testing operation in step 504. The "Z-testing" operation compares the Z-data of each of the new real sample against previously stored Z-data in the depth buffer at the location of the new real sample. If the Z-testing operation passes for all the new real samples, then the Z-data of the tile is to be compressed on a single Z plane. Under this compression state, coverage update module 118, in step 506, does not update the depth buffer, because the virtual coverage information is implied by the compression state. More specifically, all the virtual samples relate to all the real samples. This single-Z-plane compression, in one implementation, is represented by the compression state bits of "01" and is stored for the tile. An example of implied virtual coverage information is "1111" for each of the 12 virtual samples in pixel 300 as shown in FIG. 3 and as discussed above. This virtual coverage information does not need to be written to frame buffer 114 shown in FIG. 1, thereby reducing frame buffer bandwidth requirements.

On the other hand, if some or all of the new real samples fail the Z-testing operation in step 504, then coverage update module 118 may update the depth buffer in step 508. In particular, in one scenario, some new real samples may pass the Z-testing operation (the "passed real samples") but some may fail (the "failed real samples"). For the passed real samples, coverage update module 118 writes the new virtual coverage information to the depth buffer. For the failed real samples, coverage update module 118 still modifies the virtual coverage information stored in the depth buffer to disassociate the stored virtual coverage information from the failed real samples in step 508. In another scenario, all of the new real samples may fail the Z-testing operation. Coverage update module 118 then does not update the depth buffer with the new virtual coverage information, since the virtual samples will not be associated with the new real samples.

Similarly, if the results of step 502 indicate that the new real and virtual samples are not covered fully by the new primitive, then for each new real sample that is covered the new primitive, the Z-testing operation is performed in step 510. If the Z-testing operation passes, then coverage update module 118 writes the new virtual coverage information to the depth buffer in step 512. Otherwise, coverage update module 118 does not update the depth buffer in step 514.

Figure 5B:
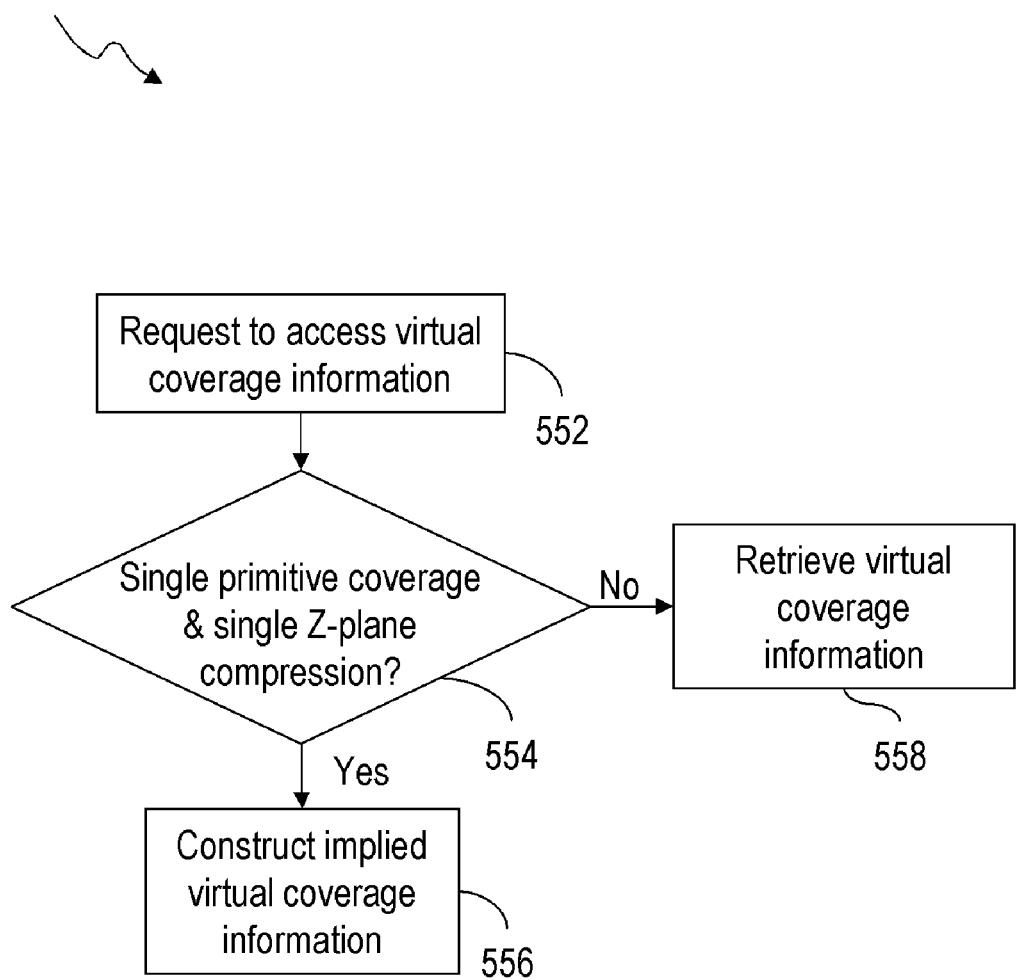
FIG. 5B is a flow diagram of a read process that a coverage update module follows to respond to a request to access virtual coverage information, according to one embodiment of the present invention.

FIG. 5B is a flow diagram of a read process, process 550, that coverage update module 118 follows to respond a request to read virtual coverage information of a tile from the depth buffer. Specifically, in step 552, coverage update module 118 receives this request to access virtual coverage information.

Then coverage update module 118 in step 554 examines the compression state bits for the tile, which are stored in cache 112 of FIG. 1. If the compression state bits indeed indicate "01," then coverage update module 118 constructs the implied virtual coverage information, such as "1111," without accessing the virtual coverage information in the depth buffer in step 556 and provides ROP unit 100 with this implied virtual coverage information. On the other hand, if the compression state bits do not indicate "01," then the virtual coverage information cannot be implied and is retrieved from the depth buffer in step 558.

There are other compression states that imply full coverage of a single primitive over the tile and thus imply the virtual coverage information. As an illustration, one color compression scheme utilizes the full coverage information. Specifically, if anti-aliased pixels are fully covered by a single primitive, then these pixels contain samples of identical colors. Because of this condition, instead of representing each of these identical colors individually, these samples can be represented in a reduced format. Following this logic, if a compression state indicates that color compression has been performed, then that means the condition of having samples of identical colors exists, which further implies that the pixels are covered by a single primitive. Although the single Z-plane compression scheme and the color compression scheme are used in this disclosure, it should be apparent to a person with ordinary skill in the art to recognize that they are used for illustration purposes only and should not be construed to limit the scope of the claimed invention.

Figure 6:
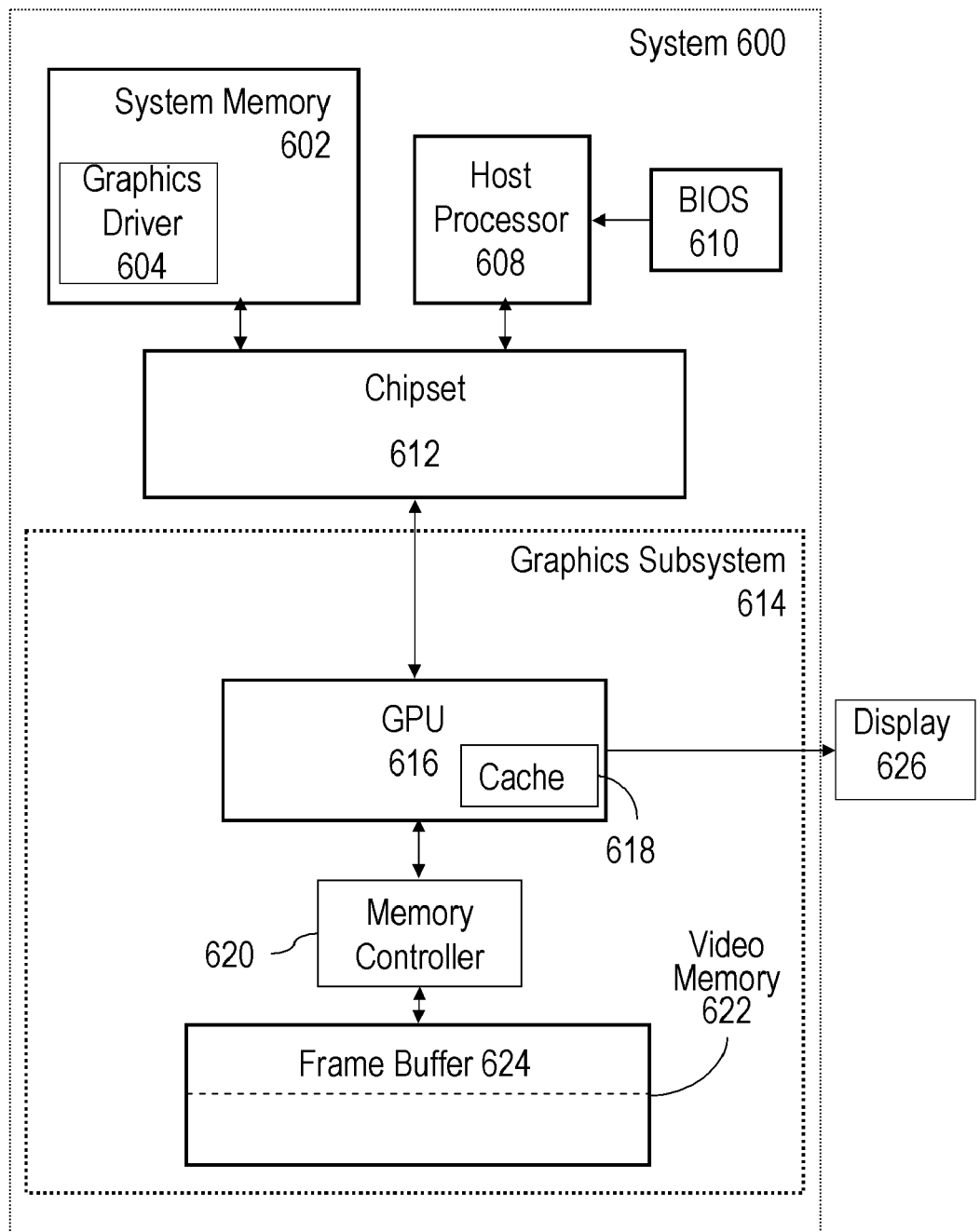
FIG. 6 is a block diagram of a system configured to implement one or more aspects of the present invention.

FIG. 6 is a block diagram of a system configured to implement one or more aspects of the present invention. Without limitation, system 600 may be a desktop computer, server, laptop computer, palm-sized computer, tablet computer, game console, cellular telephone, hand-held device, mobile device, computer based simulator, or the like. System 600 includes host processor 608, BIOS 610, system memory 602, and chipset 612 that is directly coupled to graphics subsystem 614. BIOS 610 is a program stored in read only memory ("ROM") or flash memory that is run at bootup. Graphics subsystem 614 includes a single GPU, GPU 616.

A device driver, graphics driver 604, stored within system memory 602, configures GPU 616 to share the graphics processing workload performed by system 600 and communicate with applications that are executed by host processor 608. In one embodiment, graphics driver 604 generates and places a stream of commands in a "push buffer." When the commands are executed, certain tasks, which are defined by the commands, are carried out by the GPU.

In some embodiments of system 600, chipset 612 provides interfaces to host processor 608, memory devices, storage devices, graphics devices, input/output ("I/O") devices, media playback devices, network devices, and the like. It should be apparent to a person skilled in the art to implement chipset 612 in two or more discrete devices, each of which supporting a distinct set of interfaces.

GPU 616 is responsible for outputting image data to display 626. Display 626 may include one or more display devices, such as, without limitation, a cathode ray tube ("CRT"), liquid crystal display ("LCD"), or the like. GPU 616 has on-chip cache 618 and is also coupled to memory controller 620 and video memory 622. On-chip cache 618 and video memory 622 in one embodiment correspond to cache 112 and video memory 116 as shown in FIG. 1, respectively. Video memory 622 may be used to store image data and program instructions. In one embodiment, a portion of video memory 622 is allocated to store image data for display, frame buffer 624, which corresponds to frame buffer 114 as shown in FIG. 1.

Upon execution of the commands in the aforementioned push buffer, one embodiment of GPU 616 performs the functions of the various engines as shown in FIG. 1 and performs the operations discussed above. It should be apparent to one of ordinary skill in the art to include two or more GPUs in graphics subsystems 614 or include two or more graphics subsystems 614 in a system. Moreover, although graphics subsystem 614 of systems 600 is shown to provide certain graphics processing capabilities, alternative embodiments of graphics subsystems 614 may process additional types of data, such as audio data, multimedia data, or the like.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for performing an anti-aliasing operation, comprising:
    storing first virtual coverage information for a pixel in memory;
    determining that an operating condition of said anti-aliasing operation deterministically implies second virtual coverage information for said pixel;
    constructing the second virtual coverage information for said pixel without accessing the first virtual coverage information stored in said memory; and
    applying said second virtual coverage information, instead of applying said first virtual coverage information stored in said memory, to said anti-aliasing operation.

2. The method of claim 1, wherein said operating condition includes said pixel being fully covered by a geometric primitive.

3. The method of claim 2, further comprising examining compression state information relating to the compression of said pixel in evaluating said operation condition.

4. The method of claim 3, wherein said compression state information is associated with a single Z-plane compression scheme.

5. The method of claim 3, wherein said compression state information is associated with a color compression scheme.

6. The method of claim 2, wherein the pixel includes real samples associated with graphics information, and said second virtual coverage information for said pixel includes graphics information associated with each real sample covered by said geometric primitive.

7. The method of claim 6, wherein said first virtual coverage information for said pixel is stored separately from the graphics information associated with said real samples.

8. The method of claim 1, further comprising adjusting a weight of a real sample covered by said geometric primitive in said anti-aliasing operation according to either said first virtual coverage information or said second virtual coverage information.

9. A graphics system for performing an anti-aliasing operation on a pixel, comprising:
    a raster engine;
    a coverage update module; and
    a frame buffer memory, wherein
    said frame buffer memory maintains first virtual coverage information for said pixel and real samples of said pixel in non-contiguous locations, and said coverage update module:

determines that an operating condition of said graphics system deterministically implies second virtual coverage information for said pixel, constructs the second virtual coverage information for said pixel without accessing the first virtual coverage information stored in said frame buffer memory, and provides said second virtual coverage information, instead of providing said first virtual coverage information stored in said frame buffer memory, for said anti-aliasing operation.

10. The graphics system of claim 9, wherein said operating condition includes said pixel being fully covered by a geometric primitive.

11. The graphics system of claim 10, wherein said coverage update module further examines compression state information relating to the compression of said pixel stored in a local cache in evaluating said operation condition.

12. The graphics system of claim 11, wherein said compression state information is associated with a single Z-plane compression scheme.

13. The graphics system of claim 11, wherein said compression state information is associated with a color compression scheme.

14. The graphics system of claim 10, wherein said second virtual coverage information for said pixel is affiliated with every real sample covered by said geometric primitive.

15. The graphics system of claim 9, further comprising a raster operation unit that performs Z testing on said pixels prior to said coverage update module evaluates said operating condition.

16. A computing device for performing an anti-aliasing operation, the computing device comprising:

a memory; and a processor configured to:

maintain first virtual coverage information for a pixel stored in said memory, determine that an operating condition of said anti-aliasing operation deterministically implies second virtual coverage information for said pixel, construct the second virtual coverage information for said pixel without retrieving the first virtual coverage information stored in said memory, and apply said second virtual coverage information, instead of applying said first virtual coverage information stored in said memory, to said anti-aliasing operation.

17. The computing device of claim 16, wherein said operating condition includes said pixel being fully covered by a geometric primitive.

18. The computing device of claim 17, which is configured to further examine compression state information relating to the compression of said pixel in evaluating said operation condition.

19. The computing device of claim 17, wherein the pixel includes real samples associated with graphics information, and said second virtual coverage information for said pixel includes graphics information associated with each real sample covered by said geometric primitive.

20. The computing device of claim 16, wherein said first virtual coverage information for said pixel is stored separately from the graphics information associated with said real samples.

* * * * *